United States Patent [19]

Winand

[11] 4,330,516
[45] May 18, 1982

[54] DECOLORIZATION AND PURIFICATION OF CRUDE WET-PROCESS PHOSPHORIC ACID

[75] Inventor: Louis Winand, Bourg Achard, France

[73] Assignee: Rhone-Poulenc Industries, Paris, France

[21] Appl. No.: 203,490

[22] Filed: Nov. 3, 1980

[30] Foreign Application Priority Data

Nov. 20, 1979 [FR] France .............................. 79 28530

[51] Int. Cl.$^3$ ............................................. E01B 25/16
[52] U.S. Cl. ............................. 423/321 S; 423/321 R; 423/315
[58] Field of Search ................ 423/321 S, 321 R, 315

[56] References Cited

U.S. PATENT DOCUMENTS 3,607,029  5/1968  Goret et al. ..................... 423/321 S
4,256,570  3/1981  Allen et al. ..................... 423/321 R

FOREIGN PATENT DOCUMENTS 2522220  9/1976  Fed. Rep. of Germany ... 423/321 R
54-119397  9/1979  Japan .............................. 423/321 R

*Primary Examiner*—O. R. Vertiz
*Assistant Examiner*—Gregory A. Heller
*Attorney, Agent, or Firm*—Burns, Doane, Swecker & Mathis

[57] ABSTRACT

Crude wet-process phosphoric acid prepared by mineral acid acidulation of uncalcined phosphate rock and containing contaminating amounts of organic impurities is purified and decolorized into an essentially colorless food-grade phosphoric acid, by (i) preliminarily decolorizing such crude acid, (ii) liquid-liquid extracting said predecolorized acid with an essentially water-insoluble organic extractant, (iii) back-extracting the extracted phosphoric acid with an aqueous phase, (iv) concentrating the back-extracted aqueous phosphoric acid solution at elevated, coloration-developing temperatures, and (v) then subjecting the concentrated solution which results to a final decolorization, to afford a purified, essentially colorless phosphoric acid solution.

32 Claims, No Drawings

DECOLORIZATION AND PURIFICATION OF CRUDE WET-PROCESS PHOSPHORIC ACID

BACKGROUND OF THE INVENTION

1. Field of the Invention

The present invention relates to the purification of crude wet-process phosphoric acid, and, more especially, to a process for preparing a colorless, or but slightly colored phosphoric acid from an uncalcined phosphate by means of a particular decolorizing and liquid-liquid extraction sequence.

2. Description of the Prior Art

The preparation of purified phosphoric acid or phosphate, comprising the digestion or acidulation of phosphate rock with a strong acid, such as sulfuric acid, followed by liquid-liquid extraction of the crude liquid resulting upon filtration (said crude liquid containing numerous anionic and cationic impurities and being highly colored) utilizing an essentially water-insoluble organic extractant, e.g., alkyl phosphates or $C_4$–$C_9$ aliphatic alcohols, is known to this art. Such procedure is typically followed by washing the separated organic phase containing the phosphoric acid with water, and, ultimately, by re-extraction of the acid either with water or an aqueous phase containing alkaline ions, to afford a substantially purified phosphoric acid or phosphate solution. Compare U.S. Pat. Nos. 3,607,029 and 3,767,769, assigned to the assignee hereof.

It too is known to this art that the phosphate rock starting material contains numerous impurities organic in nature, which originate either from the mineral deposit itself, from the additives introduced or incorporated during the physical pretreatment of the phosphate rock, and/or, possibly, from the organic additives introduced or incorporated upon digestion or acidulation with the strong acid (antifoaming agents, and the like). It will of course be appreciated that the amount of organic carbon present in the phosphate rock varies according to the origin of said rock. After the digestion of the rock, typically by sulfuric acid, and the filtration of the gypsum therefrom, a raw or crude liquor is recovered, which, as a function of the original content of organic carbon in the starting material rock, has a coloration ranging from a greenish-yellow to opaque muddy brown. The organic carbon content (determined via the amount of $CO_2$ obtained after oxidation in this solution) may vary significantly, for example, between 0.013 and 0.04% by weight of the solution (0.04 to 0.12%, expressed as $P_2O_5$) in a phosphate originating from Morocco, e.g. Khouribga, or Togo, to a value as high as 0.5% expressed as $P_2O_5$ for a Florida phosphate.

For certain applications, such as the manufacture of fertilizers the immediately aforesaid, while not particularly attractive, is not technically detrimental. However, this is of course not true for the case of preparation of a purified acid destined for animal or human nutritional purposes, i.e., food-grade acid.

The application on an industrial scale of continuous liquid-liquid extraction processes to such crude acids containing organic matter by means of the usual organic solvents, including recycling to extract the phosphoric acid, is difficult to effect in actual practice, or may even be impossible, depending upon the amount of colored organic material present in the beginning raw acid and the particular mode of re-extraction employed (by water or by a phosphate solution). And in the event that an emulsion of the plural phases generated by reason of the presence of the noted organic material during the intimate admixture of the crude aqueous phase with the organic extractant, remains stable upon cessation of the agitation, it is practically impossible to effect decantation of the phases, i.e., phase separation, under conditions compatible with the normal conditions of the continuous operation of an industrial plant. Furthermore, even if it is possible to attain phase separation over a prolonged (but not industrially feasible) period of time, a zone having a muddy consistency appears in the vicinity of the interface of the phases, which zone consists of blackish, gelatinous floccules. This phenomenon is enhanced with increase in the organic carbon content of the crude liquors. Similarly, the solvents are imbued with a very deep brown color when enriched in organic matter, so that after a certain number of recycles of the solvent, same can no longer be used.

As a result of the foregoing, especially with respect to the Florida phosphates which are quite rich in organic material, continuous liquid-liquid extraction becomes strictly impossible on an industrial scale, while with certain other phosphates containing but little organic matter, such operation may indeed be performed in an acceptable manner. However, even with these latter phosphates, an accumulation of gelatinous products occurs at the phase interface, particularly when certain solvents (tributyl phosphate, for example) are utilized and when the re-extraction is carried out not with water but with a monosodium phosphate solution. Furthermore, the content in organic matter of the phosphate solution is too high to give rise to sufficiently white sodium phosphate or polyphosphate solutions (for example, a sodium tripolyphosphate solution).

The aforesaid technical disadvantages and drawbacks have long been dealt with in this art by first reducing the amount of organic material in the starting material rock. It is known in this respect, for example, to calcine the rock at temperatures between 700° C. and 1000° C. prior to digestion, for a period of time ranging from a few minutes to about one hour. It is thus possible to effect a liquid-liquid extraction of the crude liquor under industrial conditions and to recover a purified phosphoric acid.

Nevertheless, the above-described calcining treatment affects only the suitability of the crude acid for downstream extraction and does not ultimately yield a re-extracted acid that is colorless after concentration; rather, fraction of the organic material remaining after the calcination of the rock, possibly in a colorless state, colors the aqueous acid after re-extraction with water, and during the final operation of concentration at an elevated temperature, such that same becomes unacceptable in the human and animal food industries, i.e., is not an acceptable food-grade additive. The result is that the already purified acid must be subjected to a further decolorization treatment, or the residual organic material must then be eliminated by oxidation with a powerful oxidant, as described in U.S. Pat. Nos. 2,013,970 and 4,044,108, and German Pat. No. 884,358, (wherein the more or less concentrated phosphoric acid is heated in the presence of a chlorate, hydrogen peroxide or another oxidant), to obtain a colorless or slightly colored acid suitable for use in the foodstuff industry.

However, the preliminary calcining treatment is expensive and highly energy intensive. Furthermore, in an industrial installation for the manufacture of wet-process phosphoric acid it frequently transpires that only a fraction of the raw acid is destined for ultimate preparation of the purified acid, while the remaining fraction, generally the larger, is destined for ultimate production of various fertilizers; consequently, in order for the installation or facility to operate continuously, while continuously producing the aforesaid two types of acid, it is necessary to calcine all of the starting material phosphate rock, and this proportionally increases the cost of calcination per ton of purified acid produced.

A possible continuous process for the extraction of a wet-process crude phosphoric acid obtained by sulfuric acid digestion of uncalcined mineral is described in published French application No. 2,132,203, at pages 9–10 (U.S. Ser. No. 129,075, filed Mar. 29, 1971 in the names of Peter Tao-I Chiang and J. D. Nickerson). These applicants also have noted that extraction of the uncalcined mineral by means of an aliphatic alcohol gives rise to an increase in the tar content of the extractant, in a continuous process characterized by solvent recycling, to such an extent that the process becomes useless. This drawback is obviated by a supplementary solvent purification stage effected with alkali, or by distillation to reduce the tar content to an acceptable level. However, it remains true that the lengths of time suggested for decantation would be incompatible with a truly industrial process.

Accordingly, serious need exists in this art for a continuous process yielding a purified phosphoric acid by liquid-liquid extraction including solvent recycling, and with the resultant acid being colorless or but slightly colored, without concomitant requirement for calcination.

SUMMARY OF THE INVENTION

Thus, a major object of the present invention is the provision of an improved continuous process for the preparation of purified phosphoric acid or purified alkali metal phosphate by liquid-liquid extraction, the resultant acid being colorless or but very slightly colored, and the phosphate rock starting material being uncalcined and containing either colored or colorless organic contaminants, said improved continuous process comprising:
  (i) acidulating the uncalcined phosphate rock with a strong mineral acid;
  (ii) filtering the slurry which results;
  (iii) predecolorizing the crude phosphoric acid thus obtained;
  (iv) liquid-liquid extracting the predecolorized acidic solution with an organic extractant/solvent which is but slightly miscible with water, and then re-extracting the organic phase, either with water or with an aqueous solution containing alkali metal ions or possibly phosphate ions;
  (v) concentrating, by heating, the aqueous phosphoric acid solution resulting from the extraction; and then
  (vi) decolorizing the phosphoric acid solution which results, with concomitant heating, to afford a purified and colorless phosphoric acid or a purified phosphate derivative.

DETAILED DESCRIPTION OF THE INVENTION

More particularly according to this invention, the starting material or beginning phosphate rock principally consists of calcium phosphate in the form of apatites, such as those obtained from Morocco, Florida or Togo, the same containing varying amounts of organic matter up to a few percent with respect to the $P_2O_5$ contained in the rock. The crushed and ground rock, without preliminary calcination, is digested/acidulated with a strong mineral acid, such as sulfuric acid, whereby a suspension of calcium sulfate in an impure phosphoric acid is obtained, which sulfate is next separated therefrom. The parameters, conditions, apparatus, etc., for the digestion step are very well known to this art.

The crude filtered solution is a highly colored solution typically having a $P_2O_5$ content on the order of 25 to 55% depending upon the conditions of digestion. Its colorimetric index for a 40% $P_2O_5$ concentration may be as high as 10, determined by the method of measurement to be described hereinbelow, and its organic carbon content may be as high as 3000 ppm with respect to the $P_2O_5$ content thereof, or even higher. Preferably, if the acid is highly colored, its $P_2O_5$ concentration will be adjusted to a maximum value of 40% for the following stage. Otherwise, values as high as 50% are acceptable.

The impure acid obtained is then subjected to suitable predecolorizing treatment. Any treatment for reducing the color to a colorimetric index value of less than 0.40, preferably less than 0.2, more particularly less than 0.1, is suitable for the purposes of the present invention. In a preferred embodiment, the predecolorizing treatment includes the use of activated carbon. The grade of the activated carbon is not critical. However, an activated carbon having a specific surface of about 1000 $m^2/g$ is preferred. The quantity of the activated carbon in relation to the weight of the $P_2O_5$ present will be a function of the amount of organic matter present and the adsorption capacity of the activated carbon employed. The contact parameters in this stage of predecolorization comprise the quantity and quality of the activated carbon, the contact time and the temperature, such parameters being mutually interrelated. Same may be predetermined, the object to be attained in this stage being the simple reduction of the colorimetric index of the crude acid to a value equal to or less than 0.40, preferably less than 0.20 and more preferably less than 0.10. Usually, the temperature of decolorization is between 30° and 100° C. for at least 0.5 hour, preferably from one to three hours. The amount of active carbon/$P_2O_5$ is typically between 0.2 and 4%, preferably between 0.5 and 1%.

For purposes of illustration, for a highly colored crude acid having a 40% $P_2O_5$ content, originating from uncalcined Florida phosphate rock, a period of treatment of 2 hours under agitation at 50° C. with 4% activated carbon in powder form, with respect to $P_2O_5$, and having a specific surface of 1050 $m^2/g$, will effect complete decolorization. After completion of this treatment, the solution is filtered and the activated carbon may be recovered for regeneration.

The activated carbon may be used in powder form in a mixture with the agitated acid or in the form of granules placed in an acid circulation column. However, it has been found that if only granulated activated carbon is used, the packing of the column becomes saturated relatively rapidly if the acid is strongly colored. For this reason, in a preferred embodiment of the invention, the predecolorization stage is effected via a mixed treatment, successively by activated carbon in powder form followed by filtering, then by activated carbon in granular form, in a column, when the process is applied to a highly colored crude acid. In this manner, the amount of powdered activated carbon is limited and the life of the column extended. Furthermore, synergy is observed between the two treatments. In this preferred embodiment, the crude acid is first treated with activated carbon in powder form and having the specific surface indicated hereinabove, in a proportion of $C/P_2O_5$ on the order of or less than 1%, for a period of time between 0.5 and 3 hours and preferably on the order of 2 hours, at a temperature between 30° C. and 100° C., preferably on the order of 50° C.

After treatment and filtration, the resulting acid is passed through a column of granulated activated carbon, the retention time in the column being controlled by the flow rate, and being on the order of 90 minutes for a column assumed to be empty initially, at a temperature between 30° C. and 100° C., preferably between 85° C. and 90° C. It is possible by the aforesaid treatment to obtain a predecolorized crude acid having a colorimetric index equal to or less than 0.10, this index approximately corresponding to a 33 Apha coloration according to the ASTM D 2108-71 standard.

However, for the desired objective in this stage of predecolorization, i.e., for obtaining a crude acid suitable for continuous liquid-liquid extraction including recycling of the water immiscible organic solvent, while at the same time affording good phase separation and providing a phase interface in the decanters conspicuously devoid of a muddy zone, colorimetric indices of less than 0.40, preferably less than 0.20, and more preferably less than 0.10, may suffice in this regard.

In the process according to the invention, the organic carbon content of the crude acid is decreased. But the rate of reduction in coloration is not automatically representative of a corresponding lowering of the carbon/$P_2O_5$ ratio, in view of the fact that such acid also contains colorless organic matter which is not necessarily eliminated over the course of the immediately aforesaid decolorization stage. Thus, for a colorimetric index of 0.10, the acid obtained may contain 1000 ppm or more of organic carbon/$P_2O_5$.

The predecolorized crude phosphoric acid obtained as above is suitable for continuous liquid-liquid extraction by means of organic solvents immiscible with water, by which liquid-liquid extraction the phosphoric acid is extracted into the organic phase which is separated in a raffinate, the phosphoric acid contained in the organic phase subsequently being re-extracted by means of water or an aqueous solution containing alkali metal ions and possibly phosphate ions, to afford a purified phosphoric acid solution, optionally after washing the enriched organic phase with water. The organic solvents typically utilized for this purpose comprise, for example, solvents such as alkyl phosphates and $C_4$–$C_9$ aliphatic alcohols, with tributyl phosphate and butyl and isobutyl alcohols being especially preferred. The conditions for carrying out these extraction and re-extraction operations too are well known to this art, with respect to temperatures, respective flow rates, apparatus employed and the arrangement thereof. Compare in this regard, for example only, U.S. Pat. Nos. 3,366,448, 3,607,029, 3,767,769 and 4,225,568, and my allowed application, Ser. No. 078,675, filed Sept. 25, 1979.

Preferably, the $P_2O_5$ content of the crude acid fed to the extraction zone is between 30% and 50%, preferably less than 40% for acids with high organic material content and less than 45% for acids with low organic material content. The purified acid obtained by re-extraction usually titers between 20% and 25% $P_2O_5$. In the course of the extraction, a fraction of the organic material present in the crude acid is separated from the purified phosphoric acid. Thus, for example, a predecolorized crude acid according to the invention containing 1000 ppm organic $C/P_2O_5$ may contain, after re-extraction, less than 400 ppm organic C.

If necessary, prior to the extraction of the phosphoric acid contained in the organic phase, the latter is treated to eliminate the sulfuric acid therefrom which accompanied the phosphoric acid in the extraction; for example, treatment according to the process described in U.S. Pat. No. 4,225,568, or my allowed application, Ser. No. 078,675, filed Sept. 25, 1979.

Usually, the dilute, purified and essentially colorless acid obtained by re-extraction with water, is recolored by concentration at elevated temperatures because of the organic matter still present therein.

The process of the present invention, therefore, further comprises, in combination with the aforedescribed stages, a final decolorization of the re-extracted acid after concentration and heating, i.e., by complete elimination of the organic materials therefrom, whereby a colorless, purified acid is obtained which is of food-grade.

The final decolorizing treatment features either a treatment with an oxidizing agent at elevated temperatures (heating), or an adsorption treatment, for example, by means of activated carbon, or a combination of the two. Prior to the decolorization treatment, the re-extracted acid must be concentrated to a $P_2O_5$ value in excess of 50%, preferably higher than 60% by weight in the case of decolorization with chlorate, or higher than 55% in the case of decolorization with hydrogen peroxide, as shall be explained hereinbelow.

In the first embodiment of decolorization by heating in the presence of an oxidant, the dilute re-extracted acid is concentrated to its final value by heating to a temperature between 80° and 300° C. under reduced pressure, or under a pressure in excess of atmospheric. Subsequently, the concentrated acid thus obtained is treated with a strong oxidant, such as a chlorate or hydrogen peroxide, at a temperature such that destruction or decomposition of the oxidant is effected. Typically, such temperature is higher than 110° C., preferably higher than 130° C. and the duration of the treatment is at least equal to one hour for the chlorate treatment and at least 15 minutes for the hydrogen peroxide treatment. For treatment at atmospheric pressure, the acid must be at a concentration of at least 60% $P_2O_5$ for the chlorate and 55% for the hydrogen peroxide so as to ensure conditions under which the oxidant is active, because the efficacy of the oxidant at lower concentrations is insufficient for extensive decolorization.

In a preferred embodiment of this particular variation, the dilute acid, i.e., 25%, is concentrated to its final value of 60% $P_2O_5$ in an indirect dual effect exchanger, the oxidant being introduced into the preconcentrated acid between the two effects such that the acid is subjected to decolorization while at the same time being concentrated under heating to the temperature required.

However, in the case of hydrogen peroxide, if extensive decolorization is desired, it should be effected by completing the treatment via the action of activated carbon under heating to at least 110° C.

In a second embodiment of the final decolorization, the acid is decolorized by means of a solid adsorbent, such as activated carbon. In this case, the dilute acid is first concentrated to at least 60% $P_2O_5$ under atmospheric pressure and the acid is heated to about 150° C. in order to develop the color, for approximately two hours. Subsequently, the acid is diluted to a $P_2O_5$ content of less than 50% to reduce its viscosity and then treated with activated carbon for a period of time of at least one hour at a temperature in excess of 110° C. After filtering, the acid is reconcentrated to its previous value, at a reduced pressure and at a temperature lower than the temperature of the first concentration.

In the case wherein the re-extraction of the organic phase containing the phosphoric acid is effected by means of an aqueous solution containing alkali metal ions, more particularly sodium ions, the solution obtained may be heated, following the adjustment of the Na/P ratio to the value desired, and after concentration in the presence of a strong oxidant, to a temperature whereat the oxidant is activated. In a preferred embodiment, the calcination (to which the sodium phosphate is subjected to prepare a polyphosphate) is also used for decolorizing by conducting same in the presence of a strong oxidant during the heating for calcination purposes. The oxidant used may be a chlorate or another oxidant, preferably nitric acid.

The process of the present invention makes it possible to conduct, on a wet-process crude phosphoric acid obtained via the acidulation of uncalcined phosphate rock containing organic impurities or contaminants, a continuous solvent extraction and re-extraction process, in order to obtain a purified acid or alkali metal phosphate having a very low coloration and organic matter content, and which is suitable for use in human or animal foods. The purified acid thus may have a coloration as low as 10 Apha and less, which is required of a food-grade acid, and an organic carbon content as low as 16 ppm/$P_2O_5$; it is also possible consistent herewith to obtain sodium tripolyphosphate displaying this degree of whiteness required by the detergent industry.

In the present description and in the examples to follow, the coloration of the acid is measured as follows:

(1) Colorimetric Indices (E1 TBP)

The colorimetric index (E1 TBP) of an impure acid is measured in the following manner.

The acid to be measured is contacted at 50° C. with an equal volume of tributyl phosphate (TBP) by intimate admixture under agitation for a few minutes. Subsequently, the mixture is decanted until two well-separated phases are obtained. With the aid of a spectrophotometer (Bausch and Lomb, Model Spectronic 70) set at 400 mμ, the extinction of the extracted TBP eventually diluted with pure TBP is measured in a cell 1 cm or more in length, with 100% transmission of the apparatus being set for pure tributyl phosphate and the extinction which the undiluted extracted tributyl phosphate would have in a 50 mm long cell is calculated.

(2) Apha Coloration

By direct measurement of the acid according to the procedure of ASTM Standard D 2108-71.

In order now to further illustrate the present invention and the advantages thereof, the following specific examples are given, it being understood that same are intended only as illustrative and in nowise limitative. Unless otherwise indicated, all parts and percentages are given by weight.

EXAMPLE 1

A crude phosphoric acid having the properties and characteristics hereinafter set forth was prepared by the known conventional process of sulfuric acid acidulation of uncalcined Florida tricalcium phosphate:

| | | |
|---|---|---|
| (i) $P_2O_5$ | 40% | |
| (ii) Organic matter | 2450 ppm C/$P_2O_5$ | |
| (iii) Colorimetric index (E 1 TBP) | 10 | |

The crude acid was decolorized with active carbon in both powder and granular forms.

The crude acid was first heated under agitation for two hours at 50° C. in the presence of 0.40% (with respect to $P_2O_5$ content) powdered activated carbon, trademark Actibon C of Norit NV (Netherlands) (BET surface: 1050 m²/g).

After filtration, the acid solution had a colorimetric index (E 1 TBP) of 3.2 and a content in organics of 1700 ppm/$P_2O_5$. The resultant acid was then continuously introduced into a column packed with granulated activated carbon (Grade CAL of Pittsburgh Chemical Company, USA, BET specific surface: 1000 m²/g) at a rate of 12 liters/hour (column cross-section, 78 cm²; height of the carbon bed, 220 cm; mass of the active carbon, 7.5 kg), the column being heated to 85°–90° C. The column prepared in this manner serves to treat 800 kg of $P_2O_5$ prior to recovering an acid having a colorimetric index (E 1 TBP) of 0.10. The average acid obtained contained 1000 ppm of organic carbon/$P_2O_5$.

The resultant acid was subsequently counter-currently extracted with tributyl phosphate, at 50° C., in a battery of eight (8) mixer-decanters, with the ratio of organic phase to aqueous phase being 9. The organic phase was next washed in a battery of seven (7) mixer-decanters with a small amount of water in a ratio of aqueous phase to organic phase of 1/18 and further comprised injection into the 5th stage of a 50% solution of sodium hydroxide, at a rate of 30 g NaOH per kilogram of $P_2O_5$, said injection being during the extraction proper; same was subsequently counter-currently re-extracted with water, at 65° C., in a battery comprising five (5) mixer-decanters, in a ratio of organic phase to aqueous phase of 6. The aqueous phase of the following purified phosphoric acid was withdrawn from the battery:

| | |
|---|---|
| $P_2O_5$ | 21.5% |
| Coloration | 9 Apha |

The aforesaid acid was concentrated for commercial use to 62% $P_2O_5$ under atmospheric pressure by heating same in a dual effect apparatus with counter-current indirect heating, comprising a first action operating at 70° C. to being the concentration to 38% $P_2O_5$ and a second action operating at 150° C. for the final concentration.

The acid obtained after a retention time of 1.5 hours at 150° C., had a coloration of 420 Apha and contained 250 ppm of organic C/$P_2O_5$.

The acid obtained in this manner was then subjected to a final decolorization according to several variations:

Method 1A

A fraction of the foregoing acid was heated at 130° C. for 1.5 hour in the presence of 2.5 g chloric acid (or 3.2 g sodium chlorate) and 80 mg hydrochloric acid per kg of acid. An acid having a 32 Apha coloration was recovered. This acid was subsequently agitated for two hours at 120° C. with 0.2% by weight of Actibon C with respect to $P_2O_5$. After filtration, the resulting final acid had a coloration of 2 Apha and contained 27 ppm of organic C with respect to $P_2O_5$.

Method 1B

A fraction of the foregoing acid was decolorized with 5 g $H_2O_2$ calculated at 100% per kg of acid at 130° C. for 15 minutes (a coloration of 66 Apha was obtained) and then via the action of 0.5% Actibon C activated carbon with respect to $P_2O_5$, under agitation for two hours at 120° C. The acid obtained had a coloration of 5.5 Apha and contained 70 ppm of organic C with respect to the $P_2O_5$.

Method 1C

A fraction of the purified acid having a concentration of 62% $P_2O_5$ was treated at 160° C. for one hour in the presence of 2.5 g $HClO_3$ (or 3.2 g $NaClO_3$) per kg of the acid. The results of this treatment are reported in the Table I which follows:

Method 1D

The purified acid having a concentration of 62% $P_2O_5$ was treated at 160° C. for one hour with 2.5 kg $HClO_3$ (or 3.2 g $NaClO_3$) and 0.08 g HCl per kg of acid. The results of this treatment are also reported in the Table I which follows.

Method 1E

The purified acid having a concentration of 62% $P_2O_5$ was further concentrated to 68% $P_2O_5$ under atmospheric pressure. The resulting acid was then treated for one hour at 170° C. with 2.5 g $HClO_3$ (or 3.2 g $NaClO_3$) per kg acid. The results of this treatment too are reported in the Table I which follows.

Method 1F

The foregoing acid having a concentration of 68% $P_2O_5$ was treated with 5 g $H_2O_2$ (calculated as 100%) at 130° C. for 15 minutes per kg of the acid. The acid obtained had a coloration of 180 Apha. After dilution to 62% $P_2O_5$ and treatment for two hours at 120° C. with 0.5% Actibon C/$P_2O_5$, the results reported in Table I were changed.

TABLE I

| | Characteristics of the decolorized acid | | | |
|---|---|---|---|---|
| % of $P_2O_5$ in the acid to be decolorized | Degrees Apha | ppm of organic C/$P_2O_5$ | ppm of $Cl^-$/$P_2O_5$ | ppm of Cl oxidant/$P_2O_5$ |
| 1C | 62 | 5 | 36 | 6.5 | < 2 |
| 1D | 62 | 5 | 30 | 1.5 | 3.5 |
| 1E | 68 | 2 | 17 | 1 | 5 |
| 1F | 68 | 7 | 65 | — | — |

The crude phosphoric acid purified by extraction and containing 21.5% $P_2O_5$, was concentrated to 55% at a final temperature of 130° C. and was then maintained at this temperature for two hours to permit any color to develop. A coloration of 180 Apha was measured and 260 ppm C/$P_2O_5$ were titrated therein. The acid obtained was heated for 15 minutes at 130° C. with 5 g $H_2O_2$ calculated at 100% per kg acid. 37 Apha were measured. The acid was then agitated with 0.5% Actibon C/$P_2O_5$ for two hours at 90° C. A coloration of 3 Apha resulted and 100 ppm of C/$P_2O_5$ were titrated therein. The foregoing acid was recolored to 14 Apha after concentration to 60% $P_2O_5$ under atmospheric pressure (maximum temperature of 155° C.). In contrast, the acid recolored to a value of only 8 Apha, when same was concentrated under reduced pressure to a 60% $P_2O_5$ content, at a temperature of no greater than 110° C., i.e., at a temperature that is clearly lower than that at which the 55% acid was obtained.

COMPARATIVE EXAMPLE 1

The crude acid of Example 1 having a 40% $P_2O_5$ content prior to predecolorization according to the invention, was liquid-liquid extracted with tributyl phosphate as set forth in Example 1. It was impossible to effect a continuous extraction on an industrial scale under these conditions, in view of the lengthy time required for the decantation of the two phases in the batteries of mixer-decanters. Furthermore, after a very long period of time of decantation, at the interface between the phases, a third, blackish muddy phase remained.

EXAMPLE 2 AND COMPARATIVE EXAMPLE 2

In these examples, the differences in the suitability for decantation of wet-process acids obtained from uncalcined Florida phosphate were compared in discontinuous laboratory operations. The crude wet-process phosphoric acid starting material was characterized as follows.

| | | |
|---|---|---|
| (i) $P_2O_5$ | | 40% by weight |
| (ii) Organic C | | 2250 ppm/$P_2O_5$ |
| (iii) Colorimetric index | | E 1 TBP: 10.6 |

(1) Crude Acid Extraction test 600 ml of the foregoing crude acid were contacted at 50° C. with 600 ml tributyl phosphate or butyl alcohol as the extractant, in a cylindrical glass vessel having a diameter of 12.5 cm and a height of 24 cm. The phases were agitated for 3 minutes by means of a Rayneri agitator equipped with a centripetal turbine having a diameter of 5.5 cm at 800 rpm and immersed in ⅔ of the liquid. The agitator was stopped and the decantations were observed as a function of time and numbered with respect to the limiting interface. The results of this test are reported in the Table II which follows.

(2) A fraction of the aforesaid crude acid starting material was treated in accordance with the decolorizing process of Example 1, with powdered activated carbon and activated carbon granules. A predecolorized acid having a colorimetric index E 1 TBP of 0.03 and containing 650 ppm C/$P_2O_5$ was obtained. Said predecolorized acid was extracted in the same manner by means of the two aforenoted solvents and their suitability for decantation was evaluated in a similar manner. The results of this particular test are also reported in the Table II which follows.

TABLE II

| Acid Employed | Solvent | % decantation |
|---|---|---|
| Crude acid from uncalcined Florida | Tributyl phosphate | 10% after 3 minutes<br>30% after 6 minutes |

TABLE II-continued

| Acid Employed | Solvent | % decantation |
|---|---|---|
| phosphate rock E1 TBP = 10.6 2250 ppm C/P$_2$O$_5$ P$_2$O$_5$: 40% | | 35% after 20 minutes |
| Crude acid from uncalcinated Florida phosphate rock E1 TBP = 10.6 2250 ppm C/P$_2$O$_5$ P$_2$O$_5$: 40% | Butyl alcohol | 20% after 1 hour |
| Crude acid from Florida phosphate rock, decolorized with activated C to E1 TBP: 0.03 650 ppm C/P$_2$O$_5$ | Tributyl phosphate | 25% after 1 minute 70% after 1.5 minutes 100% after 2 minutes 10 seconds |
| Crude acid from Florida phosphate rock, decolorized with activated C to E1 TBP: 0.03 650 ppm C/P$_2$O$_5$ | Butyl alcohol | 95% after 1 minute 100% after 1.5 minutes |

In the case of the non-predecolorized crude acid, the appearance of blackish, gelatinous floccules was noted; same accumulated at the phase interfaces and the solvents developed a very deep brown coloration.

The above experiments clearly reflect the influence of the precolorizing treatment according to the invention upon the suitability for decantation when pure solvents are used. The difference in this ability to be decanted and the presence of gelatinous substances are enhanced when solvents recycled after re-extraction are used in conjunction with a non-predecolorized acid.

EXAMPLE 3 AND COMPARATIVE EXAMPLE 3

A crude phosphoric acid was prepared by acidulation of an uncalcined Togo phosphate, having a concentration of 40% P$_2$O$_5$. This acid had a colorimetric index E1 TBP of 1.7 and contained 400 ppm of organic C/P$_2$O$_5$.

An examination of this crude acid with respect to its suitability for extraction with butyl alcohol according to the procedure of Example 2 evidenced the following characteristics:

(i) 80% decantation after 1 minute
(ii) 95% decantation after 2 minutes
(iii) 100% decantation after 3.5 minutes The presence of a few blackish skins at the interface was noted, but the solvent developed a very deep brown color. The ability to be decanted decreased markedly when a recycled solvent was used.

The subject crude acid was predecolorized in a column of granulated activated carbon under the conditions of Example 1 (concerning the granulated activated carbon) without being subjected to pretreatment with powdered active carbon. The capacity of the column in this case was 2500 kg P$_2$O$_5$ purified at least to a colorimetric index of 0.10, and the average sample of the acid obtained contained 130 ppm organic C/P$_2$O$_5$.

This acid was then treated in two different fashions to obtain an alkali metal phosphate or phosphoric acid.

(1) Production of Alkali Metal Phosphate and Tripolyphosphate

The aforesaid predecolorized acid was continuously extracted with tributyl phosphate and washed under conditions similar to Example 1 and was continuously re-extracted in a two-stage battery with a 40% aqueous monosodium phosphate solution in a volume ratio of the two phases of 1. The solvent was regenerated as described in U.S. Pat. No. 3,767,769. After neutralization of the aqueous solution resulting from the re-extraction at a ratio of Na/P=1 by means of sodium carbonate, a monosodium phosphate solution containing 60 ppm organic C/P$_2$O$_5$ was obtained.

This solution was adjusted to an Na/P ratio of 1.66 and was then calcined according to a conventional process at 380° C. in the presence of 0.15% HNO$_3$ (% with respect to P$_2$O$_5$), to prepare sodium tripolyphosphate. The whiteness of the product obtained was measured with the aid of a reflectometer trademarked Electrosynthesis, Model SP 64, equipped with amber, green and blue filters, the instrument being regulated with respect to a magnesium carbonate standard and a faience plate. The results of this operation are reported in Table III which follows.

A crude acid, not predecolorized according to the invention, was treated in the aforedescribed manner to obtain a monosodium phosphate solution containing 200 ppm organic C/P$_2$O$_5$, with the rates of decantation being lower in this particular instance. The solution was calcined under the same conditions as above in the presence of 0.15% HNO$_3$ (% with respect to P$_2$O$_5$). A sodium tripolyphosphate was obtained; the characteristics of same are also reported in the following Table III:

TABLE III

| Beginning acid | Sodium tripolyphosphate, whiteness measure | | |
|---|---|---|---|
| | Amber Filter | Green | Blue |
| Predecolorized | 95% | 96% | 98% |
| Non-predecolorized | 85% | 86% | 85% |

(2) When the subject pre-decolorized acid was exposed to a stage of extraction and re-extraction in the manner described in Example 1, a re-extraction purified acid having a 23% P$_2$O$_5$ content was obtained, which was then concentrated to 62% P$_2$O$_5$ at 150° C. The resulting acid was recolored by heating to 150° C. (240 Apha coloration) and contained 82 ppm of organic C/P$_2$O$_5$. The acid obtained was subjected to a final decolorization according to the following different embodiments:

Decolorization: Method 3A

The subject acid was decolorized by treating it at 160° C. for one hour with 1 g HClO$_3$ (or 1.4 g NaClO$_3$) per kg of the acid. A concentrated acid having a coloration of less than 5 Apha and containing 16 ppm organic C/P$_2$O$_5$ was obtained.

Decolorization: Method 3B

The colored acid having a 62% P$_2$O$_5$ content was treated for 15 minutes at 160° C. with 5 g H$_2$O$_2$ calculated at 100% per kg of acid. An acid having a coloration of 35 Apha was obtained.

The acid was then treated with 0.5% Actibon C (Norit NV) activated (% carbon with respect to P$_2$O$_5$) for two hours at 120° C. After filtering, an acid having a 62% P$_2$O$_5$ content and a coloration of 7 Apha, and containing 28 ppm of organic C with respect to P$_2$O$_5$, was obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the purification/decolorization of crude wet-process phosphoric acid prepared by mineral acid acidulation of uncalcined phosphate rock and containing contaminating amounts of organic impurities, which process comprises (i) preliminarily decolorizing such crude acid with activated carbon, (ii) liquid-liquid extracting the resultant predecolorized acid with an essentially water-insoluble organic extractant, (iii) back-extracting the extracted phosphoric acid with an aqueous phase to afford an aqueous phosphoric acid solution, (iv) concentrating the resultant back-extracted aqueous phosphoric acid solution to a content by weight of $P_2O_5$ in excess of 50% by heating at elevated, coloration-developing temperatures, and (v) then subjecting the resultant concentrated solution to a final decolorization by heating with a strong oxidant, an adsorbent, or both, to afford a purified, essentially colorless phosphoric acid solution having a coloration of 10 Apha or less.

2. The process as defined by claim 1, said process being conducted continuously via a recycling of the essentially water-insoluble organic extractant.

3. The process as defined by claim 1 or 2, wherein the crude acid in step (i) is predecolorized to a colorimetric index not in excess of 0.4

4. The process as defined by claim 1 or 2, wherein the crude acid in step (i) is predecolorized to a colorimetric index not in excess of 0.2.

5. The process as defined by claim 1 or 2, wherein the crude acid in step (i) is predecolorized to a colorimetric index not in excess of 0.1.

6. The process as defined by claim 3, wherein the crude acid starting material has a concentration in $P_2O_5$ ranging from 25 to 55% by weight.

7. The process as defined by claim 3, wherein the crude acid starting material has a concentration in $P_2O_5$ ranging from 40 to 50% by weight.

8. The process as defined by claim 1, wherein the predecolorization step (i) is effected at a temperature ranging from 30° to 100° C. for a period of time of at least about 0.5 hour.

9. The process as defined by claim 8, wherein said period of time ranges from about 1 to 3 hours.

10. The process as defined by claim 1, wherein the amount of activated carbon employed in the predecolorization step (i) ranges from about 0.2 to 4% by weight, based upon the weight of $P_2O_5$ in the crude acid.

11. The process as defined by claim 10, wherein the amount of activated carbon employed in the predecolorization step (i) ranges from about 0.5 to 1% by weight, based upon the weight of $P_2O_5$ in the crude acid.

12. The process as defined by claim 8, wherein the activated carbon employed in the predecolorization step (i) is powdered and the predecolorization therewith is followed by additional predecolorization with granular activated carbon.

13. The process as defined by claim 6, wherein the essentially water-insoluble organic extractant is an alkyl phosphate or a $C_4$–$C_9$ aliphatic alcohol.

14. The process as defined by claim 6, further comprising washing the organic phase resulting from extraction step (ii), prior to back-extraction step (iii), with minor amounts of water and sodium hydroxide, to afford after back extraction a dilute aqueous solution of purified phosphoric acid.

15. The process as defined by claim 6, wherein the back-extracted aqueous phosphoric acid solution is concentrated in step (iv) to a content by weight of $P_2O_5$ in excess of 55%.

16. The process as defined by claim 1, wherein the back-extracted aqueous phosphoric acid solution is heated to a temperature of at least 110° C. for at least one hour, either concurrently with or subsequent to the concentration step (iv).

17. The process as defined by claim 1, wherein the back-extracted aqueous phosphoric acid solution is heated to a temperature of at least 130° C. for at least two hours, either concurrently with or subsequent to the concentration step (iv).

18. The process as defined by claim 1, wherein in the final decolorization step (v), the strong oxidant is a chlorate, alkali metal chlorate or hydrogen peroxide, and the adsorbent is activated carbon.

19. The process as defined by claim 1, wherein the final decolorization step (v) is effected at a temperature of at least 110° C.

20. The process as defined by claim 1, wherein the final decolorization step (v) is effected at a temperature of at least 130° C.

21. The process as defined by claim 19, wherein the final decolorization step (v) is effected with a chlorate for a period of time of at least one hour.

22. The process as defined by claim 19, wherein the final decolorization step (v) is effected with hydrogen peroxide for a period of time on the order of 15 minutes.

23. The process as defined by claim 1, wherein the back-extraction step (iii) is effected with water.

24. The process as defined by claim 14, wherein the back-extraction step (iii) is effected with an aqueous solution comprising alkali metal ions.

25. The process as defined by claim 24, wherein said aqueous solution comprising alkali metal ions further comprises phosphate ions.

26. The process as defined by claim 24, further comprising adjusting the Na/P ratio of the solution to any desired value, and then calcining the resulting alkali metal phosphate solution in the presence of an oxidant to obtain a colorless alkali metal polyphosphate.

27. The process as defined by claim 25, further comprising adjusting the Na/P ratio of the solution to any desired value, and then calcining the resulting alkali metal phosphate solution in the presence of an oxidant to obtain a colorless alkali metal polyphosphate.

28. The process as defined by claim 26, wherein the oxidant present during calcination is nitric acid.

29. The process as defined by claim 27, wherein the oxidant present during calcination is nitric acid.

30. The process as defined by claim 6, wherein the uncalcined phosphate rock is Florida phosphate rock.

31. The process as defined by claim 6, wherein the uncalcined phosphate rock is Togo phosphate rock.

32. The process as defined by claim 6, wherein the uncalcined phosphate rock is Moroccan phosphate rock.

* * * * *